June 29, 1965 R. D. MALMQUIST 3,191,468
BALL SURFACING MACHINE
Filed April 16, 1962 3 Sheets-Sheet 1
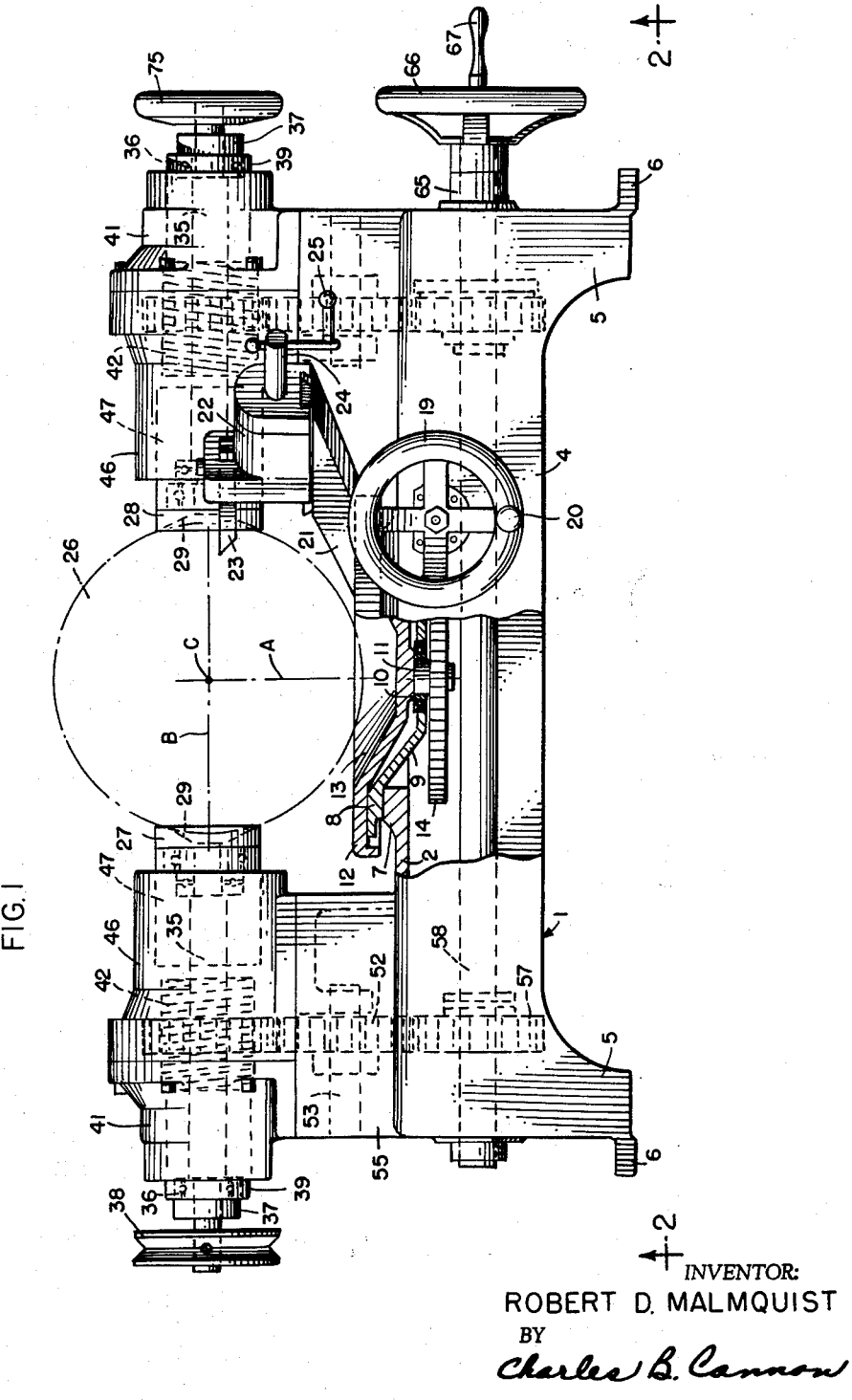
FIG. I
INVENTOR:
ROBERT D. MALMQUIST
BY
Charles B. Cannon
ATT'YS

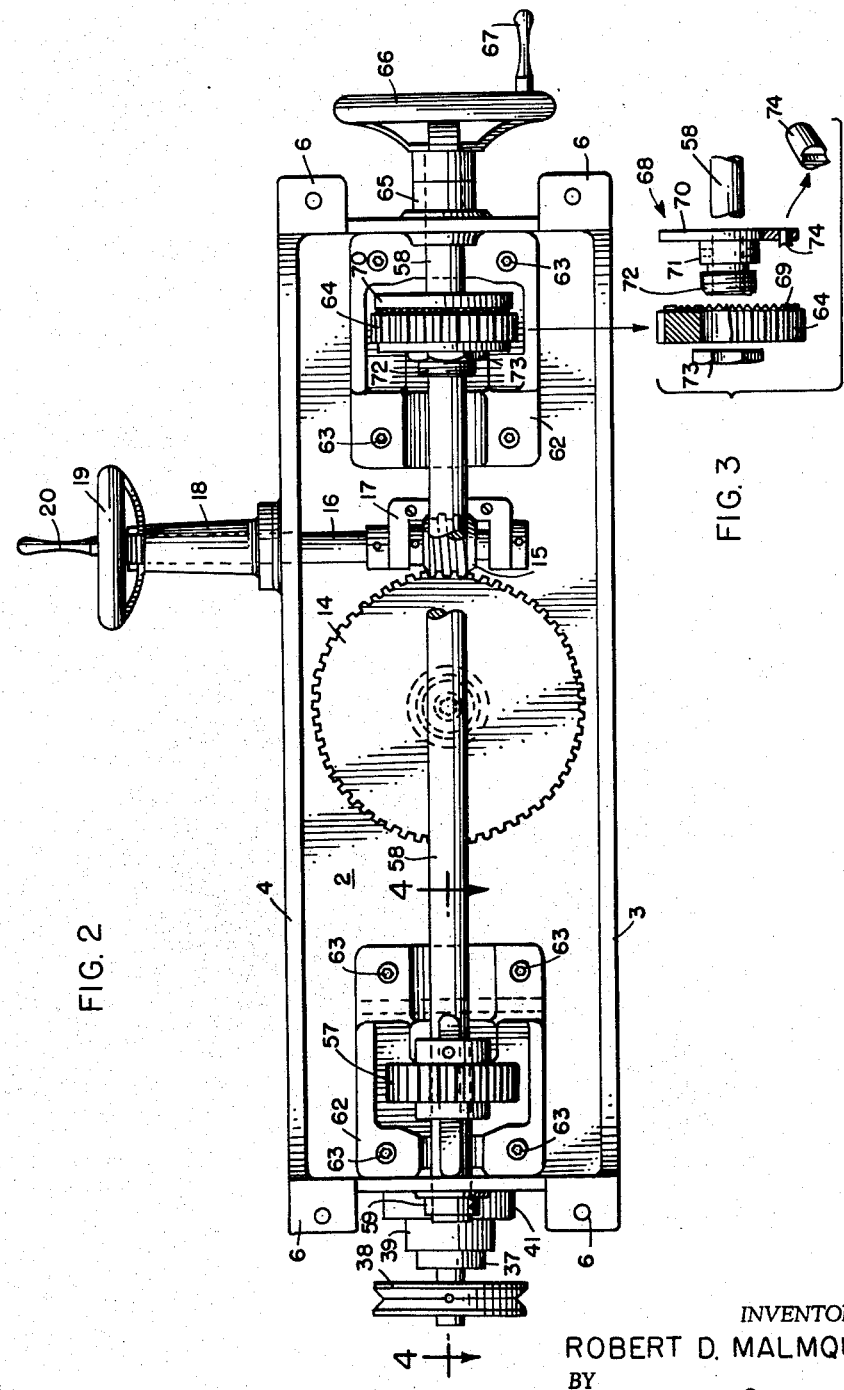

June 29, 1965  R. D. MALMQUIST  3,191,468
BALL SURFACING MACHINE
Filed April 16, 1962  3 Sheets-Sheet 3

INVENTOR:
ROBERT D. MALMQUIST
BY
Charles B. Cannon
ATT'YS

United States Patent Office 3,191,468
Patented June 29, 1965

3,191,468
BALL SURFACING MACHINE
Robert D. Malmquist, 727 North East Ave., Oak Park, Ill.
Filed Apr. 16, 1962, Ser. No. 187,499
6 Claims. (Cl. 82—12)

This invention, in general, relates to a ball surfacing machine. The machine has particular adaptation to the resurfacing of bowling balls and similar balls to remove nicks, scratches and the like in the surface. The machine can also be used, however, for the final cut or other cut on a new bowling ball or like ball.

Bowling balls are generally made from hard rubber or from a resinous composite. They develop nicks and cuts over a period of use and should be resurfaced periodically. Also, I have observed that even new bowling balls are often not true spheres—a factor apparently attributable to a lack of precision in manufacturing technique. I have noted by micrometer readings on some new bowling balls that their radii at different points on the ball can vary in the order of five thousandths of an inch, and sometimes even more. The machine of this invention is capable of resurfacing new or old bowling balls within a radii variance over the entire ball within 0.001 inch.

Briefly, my machine comprises a turntable carrying a lathe-type cutting head and tool. The turntable swings the cutting tool in a circular path about the axis of the turntable. The ball is releasably held in the machine with the ball center in alignment with the axis of the turntable. In the preferred practice of the invention, the ball is held on diametrically opposite sides by a pair of rotatable plates or jaws. In the resurfacing operation, the ball is rotated in a plane different from the plane of orbit of said cutting tool and preferably a plane about normal to the plane of orbit of the cutting tool.

It is a primary object of the invention to provide a machine capable of cutting objects into spheroids within close tolerances.

Another object of the invention is to provide a machine of relatively simple mechanical structure capable of resurfacing a ball into a sphere of close tolerances.

Still another object of the invention is to provide a machine especially adapted for the resurfacing of bowling balls and like balls.

A further object of the invention is to provide cooperating, opposing jaw members for holding a ball in the machine with the ball center in alignment with the axis of orbit of a cutting tool used to resurface the ball when the latter is rotating while held in said jaws.

Having briefly described the invention and certain primary objects and advantages thereof, further objects and advantages of the invention and adaptations thereof will be apparent from the following further description and claims, which by way of illustration, show my preferred embodiment of the invention and the principles thereof in what I now consider to be the best mode for applying these principles to practice. Other embodiments of the invention embodying the same or equivalent principles may be used and structural changes may be made without departing from the true spirit and principles of the invention.

In the drawings:

FIG. 1 is a front elevation of my preferred form of a ball resurfacing machine with a segment thereof broken away to better illustrate the detail of the turntable.

FIG. 2 is a bottom plan view of the machine of FIG. 1 with the cutting tool head omitted and a segment of the longitudinal shaft broken away.

FIG. 3 is an exploded, plan view of details of a gear and associated mechanism in FIG. 2.

Figure 4:
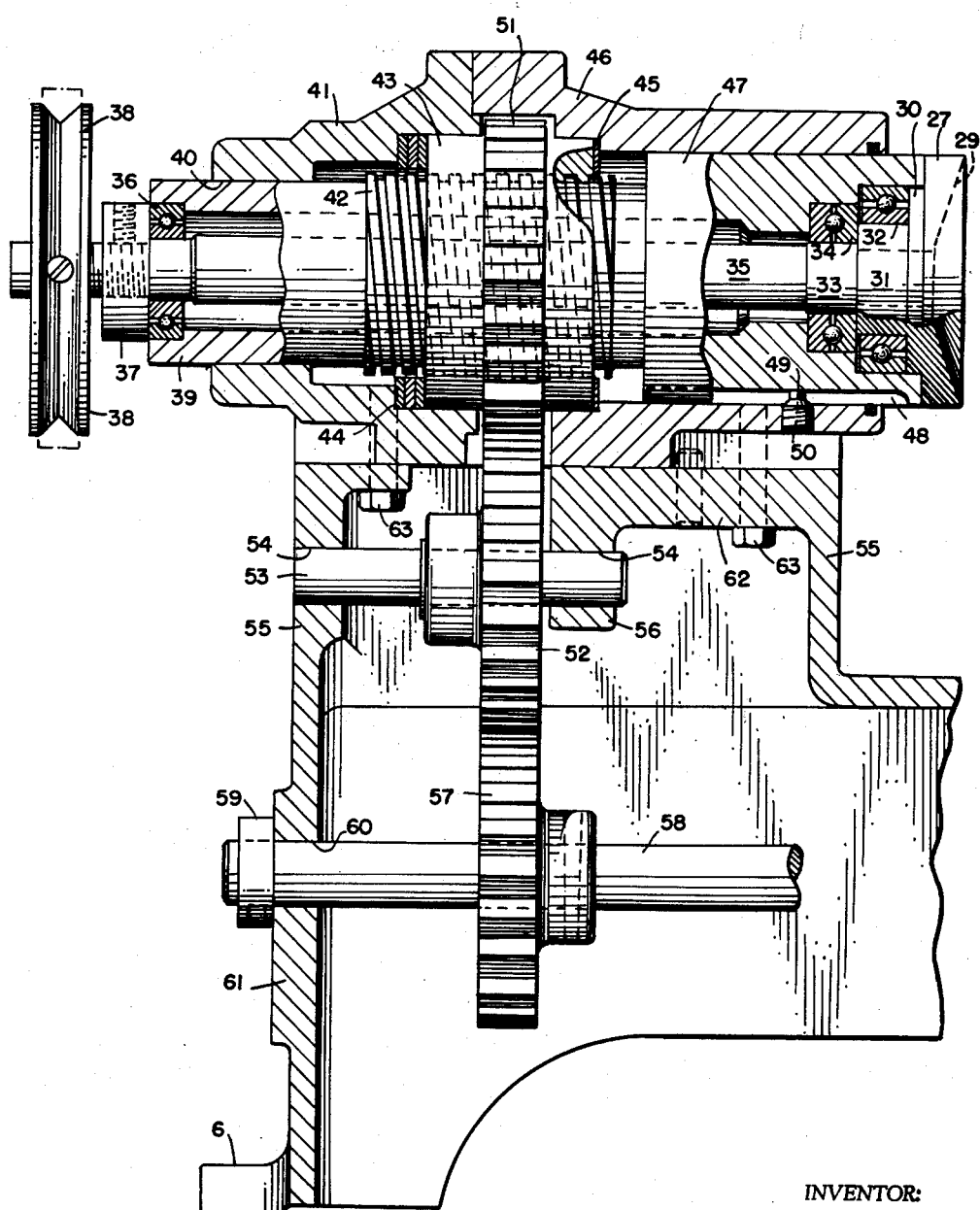
FIG. 4 is a cross-section in side elevation of a segment of the machine, taken on section 4—4 of FIG. 2.

Referring to the drawings, the ball surfacing machine comprises a machine base 1 composed of a one-piece casting. The machine base 1 has a top plate 2 and side plates 3 and 4, the latter having four legs 5 at the corners of the machine base. The legs 5 have feet 6 which can be attached by bolts to a table, support frame or the like.

The top plate 2 has a raised, ring-shaped rim 7 on which is supported a round turntable bearing plate 8. The turntable bearing plate has a frusto-conical mid-segment for accommodating in its recess the turntable hereafter described. The turntable bearing plate has a center aperture in which is mounted the turntable shaft ball bearing ring 10. The latter rotatably holds the turntable shaft 11.

The turntable shaft 11, in turn, supports the turntable 12. Turntable 12 is further supported near its periphery by a sliding contact of the underside of the turntable 12 with the round turntable bearing plate 8. This annular support of the turntable 12, coupled with the ball bearing support of the shaft 11, allows the turntable to rotate about the axis of the shaft 11.

The shaft 11 has coupled thereto a turntable gear 14 which is driven by the worm gear 15. Worm gear 15 is mounted on gear shaft 16 which is rotatably supported in a bearing assembly 17 attached to the underside of the top plate 2. The gear shaft 16 is rotatably journalled in a hollow sleeve 18 projecting outwardly from the side plate 4. The gear shaft 16 is turned by means of a crank wheel 19 coupled thereto. Crank wheel 19 has an outwardly projecting handle 20 attached to its rim.

The turntable 12 carries an outwardly and upwardly sloping arm 21 on which is supported a lathe tool head 22 of any suitable construction, many forms of which are common and well known in the art. The lathe tool head 22 holds a cutting bit 23, preferably a tool steel, carbide, or a diamond tipped bit. The bit 23 is reciprocated toward or away from the workpiece by turning the lathe tool shaft 24 by means of its handle 25.

The workpiece is a spheroid 26, e.g., a bowling ball or like ball. The ball is supported in the machine above and out of contact with the turntable 12 by a pair of clamping or holding discs or plates 27, 28 situated in opposing relationship on opposite sides of the workpiece.

In the illustrated embodiment, the discs or plates 27, 28 may be described as being vise clamps in that they function similarly to a vise in holding the spheroid therebetween.

These plates reciprocate in opposite directions at equal rates of linear travel by means of a mechanism later described. They are moved apart a distance sufficient to allow insertion of the ball 26 therebetween, after which they are moved toward each other until the ball rests against the rim areas of the frusto-conical recesses 29 provided in the front face of the plates 27 and 28.

The plates 27 and 28 are a part of a spindle. Reference is made particularly to FIG. 4 which shows the details of the spindle structure for the plate 27.

The spindle comprises, in addition to the plate or disc 27, a ring-shaped segment 30 of smaller diameter than the disc 27 and a cylindrical segment 31 of smaller diameter than the disc-shaped segment 30. The parts 27, 30 and 31 are an integral piece and have an axial aperture extend therethrough. The integral piece composed of parts 27, 30 and 31 is shrink-fitted on the end of the drive shaft 35 and may be considered to be an integral part of the drive shaft 35.

The cylindrical segment 31 is rotatably supported by means of the ball bearing ring 32. The drive shaft 35 has a cylindrical segment 33, about which is provided the ball bearing, thrust ring 34, one race of which bears against the side wall of the cylindrical segment 31 to provide a thrust support.

The opposite end of the shaft 35 is rotatably journalled in a ball bearing 36. The shaft 35 threadedly carries a locking disc 37 for drawing the shaft up to eliminate play in the axial disc. The locking disc is locked on the shaft 35 by a set screw and is rotatable with the shaft. It has a sliding contact with the outer face of the ball bearing 36. The outer end of the shaft 35 has a V-belt pulley 38 mounted thereon for rotatably driving the spindle assembly. The pulley 38 is driven by V-belt connected to an electrical motor (not shown).

The spindle assembly is rotatably journalled in a holholw spindle 39 which reciprocates axially in a round hole 40 of the head stock piece 41. The hollow spindle comprises a cylindrical segment having square threads 42 on the outer surface thereof near its mid-section. The square threads 42 are threadedly engaged with threads on the inner surface of a hollow cylinder 43. The hollow cylinder 43 is rotatable in the head stock but is precluded from axial movement by the rings 44 and 45, which bear against the outer edges of the side walls of the hollow cylinder 43.

The head stock comprises, in addition to the head stock piece 41, an interfitting head stock piece 46 having an axial hole therethrough in which is slidably supported the cylindrical, enlarged, segment 47 of the hollow spindle 39. The cylindrical segment 47 has an axial slot 48 in its outer wall into which extends a pin 49 having a threaded portion 50 threadedly mounted in a tapped hole in the head stock piece 46. This slot and pin connection allows the hollow spindle 39 to reciprocate axially in the head stock but precludes its rotation therein.

The cylinder 43 has a ring portion on its outer cylindrical wall. This ring portion is cut to provide gear teeth—forming a spur gear 51 which rotates the cylinder 43. The spur gear meshes with an idler gear 52 mounted on idler gear shaft 53. The gear shaft 53 is rotatably journalled in journal holes 54 provided in the end wall of an inset box segment 55 cast integrally with the base 1 and in a downwardly depending arm 56 inside the box segment 55.

The idler gear 52 meshes with a drive gear 57 mounted on drive shaft 58. Drive shaft 58 has a retainer ring 59 attached to its outer end by a set screw and is rotatably journalled at this end in a journal hole 60 in the end wall 61 of the machine base 1.

The head stock segments 41 and 46 are bolted to the top wall 62 of the box segment 55 by bolts 63 extending upwardly through the top wall 62 and into the bottom of the head stock segments 41 and 46.

The disc 28 and mechanism associated therewith, i.e., the rotatable spindle, the hollow spindle, and gear train which rotatably drives the hollow spindle is the same as the mechanism described above with relation to the disc 27 and associated mechanism. Where applicable, like numerals have been used to designate like parts. The gear mounted on the shaft 58, however, is connected with the shaft in a slightly different manner so as to provide an adjustable connection between the gear 64 and the shaft 58. It is of critical importance in the machine of this invention that the spheroid 26 be held between the plates 27 and 28 so that the center C of the spheroid is exactly, or at least in very close proximity to, the axis A of rotation of the shaft 11 for the turntable 12. When this relationship is provided, the tip of the cutting tool 23 moves in circular orbit with relation to the spheroid to cut a nearly perfect spheroid.

Stated another way, the shortest straight-line distance between the axis of rotation A of the turntable 12 to the edges of the frusto-conical recesses in the plates 27 and 28 should be exactly the same so that when the plates or discs 27 and 28 are moved together simultaneously, they suspend the spheroid 26 with its center C lying on the axis of rotation A.

The adjustable connection between the gear 64 and the shaft 58 is used to adjust the spatial relationship of the discs or plates 27 and 28 to provide the aforesaid distance relationships. These adjustments are made when the machine is readied for shipment to a customer and periodically thereafter, should an adjustment be warranted.

The gears 57 and 64 are rotated simultaneously by the shaft 58 which is rotatably journalled in the journal hole 60 and in a journal sleeve 65. The shaft 58 is turned by a crank wheel 66 connected thereto, which wheel has a handle 67 extending outwardly from the rim of the wheel. The hand of the threads 42 on the hollow spindles 39 and inside the hollow cylinders 43 are opposite the hands so that the spindle assemblies for the plates 27 and 28, respectively, reciprocate in the respective head stocks in opposite directions when the shaft 58 is turned. Thus, by rotating the shaft 58 in one direction, the discs 27 and 28 move toward each other while, upon rotating the shaft 58 in the opposite direction, the discs or plates 27 and 28 move away from each other.

The details of the adjustable connection between the shaft 58 and the gear 64 are shown in FIG. 2 and in the exploded view of FIG. 3. Adjustable assembly connection 68 comprises a serrated face 69 on one side of the gear 64. A disc 70 having a hub 71 and a threaded end 72 is connected by a pin connection to the shaft 58 so that the disc 70 and its component parts 71 and 72 are turned with the shaft 58. The threaded end 72 extends through the gear 64 and the gear rides freely on the hub 71. A nut 73 is threaded on the threaded end 72 to draw the disc 70 against face 69. The disc 70 has at least one serrated pin 74 whose serrated end meshes with the serrations of serrated face 69 to provide a nonslip connection between the disc 70 and the gear 64.

To adjust the relative position of the disc 28 with relation to the axis of rotation A of the turntable to provide the previously described relationships between the axis and the plates or discs 27 and 28, the nut 73 is loosened sufficiently so that the gear 64 can be rotated on the hub 71, whereby the plate or disc 28 can be moved to the proper position. Thereafter, the nut 73 is tightened and the machine is ready for a spheroid surfacing operation.

The spindle assembly for rotatably turning the plate or disc 27 includes the drive pulley 38. The plate 27 applies the rotation force to the spheroid 26. The spindle assembly for the plate or disc 28 is freely rotatable whereby the drive imparted to the spheroid 26, via the plate or disc 27, rotates the plate or disc 28 and its associated spindle assembly. If desired, a hand wheel 75 may be attached to the end of the shaft 35 of the latter spindle assembly for turning the spheroid 26 by hand during micrometer measurements of the resurfaced spheroid or other operations.

The surfacing or resurfacing of a bowling ball or other spheroid 26 is accomplished by holding the spheroid 26 between the plates or discs 27 and 28 and turning the hand wheel 66 until the diametrically opposite sides of the spheroid are held in the frusto-conical recesses of said plates or discs. The spheroid is checked to be sure that it is seated properly in the frusto-conical recesses.

In a properly adjusted machine, the proper seating of the spheroid 26 in the frusto-conical recesses 29 automatically centers the center C of the ball on the axis of rotation A of the turntable. The motor drive is activated and the spheroid 26 rotates about a horizontal axis corresponding with the axis of the spindle assemblies for the plates or discs 27 and 28.

The tool bit 23 is then moved into light cutting contact with the spheroid 26 by turning the shaft 24 of the lathe tool head 22. Then the crank wheel 19 is turned to rotate turnable 12, which, in turn, moves the bit 23 in circular orbit over the surface of the spheroid.

After one or more passes of the bit 23 across the rotating spheroid 26, the motor drive is deactivated. The crank wheel 66 is turned sufficiently so that the spheroid is held loosely by the plates or discs 27 and 28. The spheroid is then rotated by hand so that the portions of the spheroid inside and adjacent to the plates or discs 27 and 28 are rotated to a position where they can be contacted by the bit 23 in a second cutting operation. These portions are those which the bit 23 could not reach during the first surfacing or resurfacing operation described immediately above. For example, the spheroid 26 can be rotated by hand about 90° about its horizontal axis which is transverse to the axis of the spindle assemblies.

After rotating the spheroid by hand, it is then tightly clamped between the plates or discs 27 and 28 in the manner previously described. The motor drive is again activated and the bit 23 is moved in circular orbit over the surface of the spheroid taking a cut corresponding to the cut taken in the first surfacing or resurfacing step.

The spheroid can then be removed from the machine for polishing or other finishing steps.

In the machine illustrated, the axis of rotation B of the spheroid 26 intersects the axis of rotation A at 90°. This is the preferred arrangement. It is within the contemplation of the invention, however, to construct a machine wherein the axes A and B intersect at an acute angle. The axis of rotation of the spheroid cannot be coincident with the axis of rotation of the tool (a 0° angle) because the tool would cut only a single line when the tool is orbited about its axis of rotation. However, any angle between the axes is operable although the smaller angles give only a relatively narrow band cut during the orbit of the tool about the rotating spheroid in comparison with the wide band cut by the tool when the angle between the axes A and B approaches 90°. An angle of about 90° is best although angles as low as about 45° are suitable for most purposes.

Therefore, is will be seen that some of the important features of the invention are the movement of the cutting tool 23 and its supporting lathe head 22 in a circular arc about an axis of rotation A, the supporting of the spherical workpiece with its center line substantially on the axis of rotation A, and the rotation of the workpiece about an axis B through the center of the workpiece but angularly displaced with respect to the axis of rotation A. In the preferred form of the invention, the spindles 35 are rotatably journalled in each head stock 41, 46 with ther axes of rotation aligned with each other. The inwardly tapered recesses 29 in plates 27, 28 are advantageously employed to center the workpiece 26 with the axes previously described. For holding a spherical workpiece, the preferred shape of these recesses is one of a conical wall recess in which the cone axes of the conical walls lie on the axes of rotation B of the plates 27, 28 and their respective spindles 35. Also, in the preferred embodiment of the invention, the plates 27, 28 are moved toward and away from each other at equal linear rates of travel by the utilization of a thread 42 on each of the hollow spindles 39 of the same pitch but opposite hand on the outer, cylindrical wall thereof. This arrangement allows the plates 27, 28 and their respective spindles to be reciprocated by the reciprocation of the hollow spindles 39 simultaneously by the rotation in the same direction of the gear toothed ring 51 of each spindle at equal angular velocities by the gear trains connecting the rings 51 with the shaft 58. Other advantageous features of the invention have been described in the description preceding.

It will, thus, be seen from the foregoing description, considered in conjunction with the accompanying drawings, that the present invention provides new and improved machines and mechanisms thereof having novel features, advantages and characteristics and accomplishing its intended objectives, including those hereinbefore pointed out and others which are inherent in the invention.

I claim:
1. An apparatus for surfacing bowling balls and like spheres to close tolerances, said apparatus comprising, in combination,
  (a) a machine base for supporting various components of the apparatus;
  (b) a pair of oppositely but coaxially disposed headstocks supported on said base;
  (c) a pair of oppositely but coaxially disposed hollow, longitudinally reciprocable hollow spindle means, including exterior threads thereon, for supporting a pair of rotatable spindles;
  (d) means for preventing rotation of said hollow spindles;
  (e) a pair of rotatable spindles, including workpiece-engaging jaws, each of said spindles being journalled in one of said hollow spindles and longitudinally reciprocable therewith;
  (f) a pair of rotatable sleeve means, including interior threads for engagement with said exterior threads, for causing longitudinal movement of said hollow spindles toward and away from a workpiece;
  (g) means for preventing longitudinal movement of said sleeve means;
  (h) means for rotating said sleeve means at a common rate causing movement of said hollow spindles toward and away from a centerpoint disposed therebetween;
  (i) a cutting tool for surfacing a workpiece; and
  (j) an arcuately movable support for said cutting tool, said support being so constructed and arranged that the support and the tool held therein are pivotable about a pivot axis which intersects the rotational axis of said rotatable spindles.

2. An apparatus as defined in claim 1 in which the said means for rotating said sleeve means at a common rate include (1) an operating handwheel, (2) gear means operatively connected to each of said sleeve means, and (3) means affording a positive connection between said gear means and said handwheel.

3. An apparatus a sdefined in claim 1 in which said means for rotating said sleeve means includes (1) an operating handwheel, (2) an operating shaft including first gear means thereon positively connected between said handwheel and one of said sleeves, (3) a second gear positively connected to the other of said sleeves, (4) attachment means releasably connecting said second gear to said operating shaft, wherein said spindles are movable toward and away from each other at a constant rate but are also movable independently of each other when said attachment means are released, whereby each workpiece-engaging jaw may be placed a substantially identical distance from said pivot axis, and whereby the workpiece may be exactly centered over said pivot axis.

4. An apparatus as defined in claim 3 in which said attachment means includes a disc and an indexing pin, said disc being immovable relative to said operating shaft and wherein said second gear includes a serrated face for receiving said indexing pin and causing said gear and said shaft to maintain the same angular rates of rotation.

5. An apparatus as defined in claim 4 which includes handwheel means for arcuately moving said cutting tool support, and in which said cutting tool support is in the form of a turntable journalled in supporting bearings.

6. An apparatus as defined in claim 1 which includes handwheel means for arcuately moving said cutting tool support.

References Cited by the Examiner

UNITED STATES PATENTS

| | | | |
|---|---|---|---|
| 39,817 | 9/63 | Johnson | 82—12 |
| 125,571 | 4/72 | Hyatt | 82—12 |
| 2,322,127 | 6/43 | Groene | 82—18 XR |
| 2,715,848 | 8/55 | Schmidt | 82—12 |

FOREIGN PATENTS 1,027,769  2/53  France.

WILLIAM W. DYER, *Primary Examiner.*